United States Patent
Ishikawa et al.

(10) Patent No.: US 6,758,579 B2
(45) Date of Patent: Jul. 6, 2004

(54) ILLUMINATING-LIGHT CONTROLLER, PROJECTOR, AND ILLUMINATING-LIGHT CONTROL METHOD

(75) Inventors: Yoshimoto Ishikawa, Yamato (JP); Masayuki Ishikawa, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 09/778,142

(22) Filed: Feb. 7, 2001

(65) Prior Publication Data

US 2001/0053078 A1 Dec. 20, 2001

(30) Foreign Application Priority Data

Feb. 8, 2000 (JP) ......................................  2000-031049

(51) Int. Cl.[7] ............................................... G03B 21/14
(52) U.S. Cl. ..................... 362/238; 362/26; 362/293; 353/94; 353/98; 353/31; 353/99; 348/771; 348/743; 348/742
(58) Field of Search ............................. 353/94, 31, 98, 353/99; 348/771, 772, 743, 742, 744; 359/629, 290, 291, 224, 293; 362/26, 282, 238, 293, 287

(56) References Cited

U.S. PATENT DOCUMENTS 5,612,753 A * 3/1997 Poradish et al. ............ 348/743
5,640,214 A * 6/1997 Florence ...................... 348/743
5,765,934 A * 6/1998 Okamori et al. .............. 353/94
5,999,306 A * 12/1999 Atobe et al. ................. 359/205
6,147,720 A * 11/2000 Guerinot et al. ............ 348/744
6,347,002 B1 * 2/2002 Hagelin et al. ............. 359/201
6,505,939 B1 * 1/2003 Bierhuizen et al. ........... 353/94
6,543,900 B2 * 4/2003 Noji et al. ..................... 353/94
6,549,692 B1 * 4/2003 Harel et al. ................... 385/18
6,583,912 B1 * 6/2003 Van Lerberghe ............ 359/204
6,588,944 B2 * 7/2003 Harris .......................... 385/88

FOREIGN PATENT DOCUMENTS

JP  10-153755  6/1998

* cited by examiner

Primary Examiner—Sandra O'Shea
Assistant Examiner—Anabel M Ton
(74) Attorney, Agent, or Firm—Anne V. Dougherty; Derek S. Jennings

(57) ABSTRACT

An illuminating-light controller includes a light modulator for projecting light on a corresponding area by tilting a reflecting surface. A first light source emits a first light that is projected on the corresponding area by illuminating the first light to the reflecting surface of the spatial light modulator being tilted at a first angle. A second light source for emits a second light that is projected on the corresponding area by illuminating the second light to the reflecting surface of the light modulator being tilted at a second angle. Still further, included is a control section for controlling the first light emitted from the first light source and the second light emitted from said second light source.

19 Claims, 13 Drawing Sheets

[Figure 1]
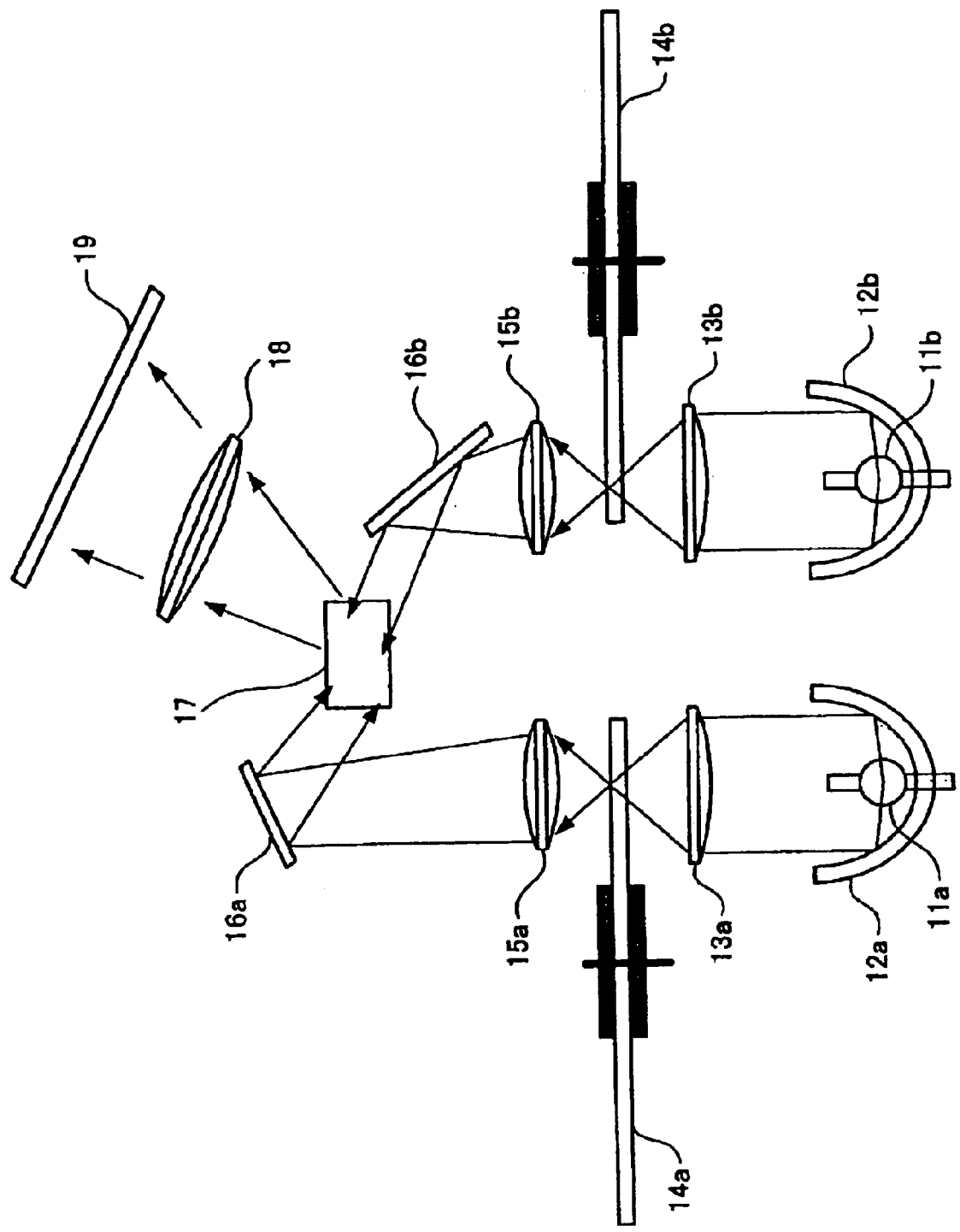

[Figure 2]
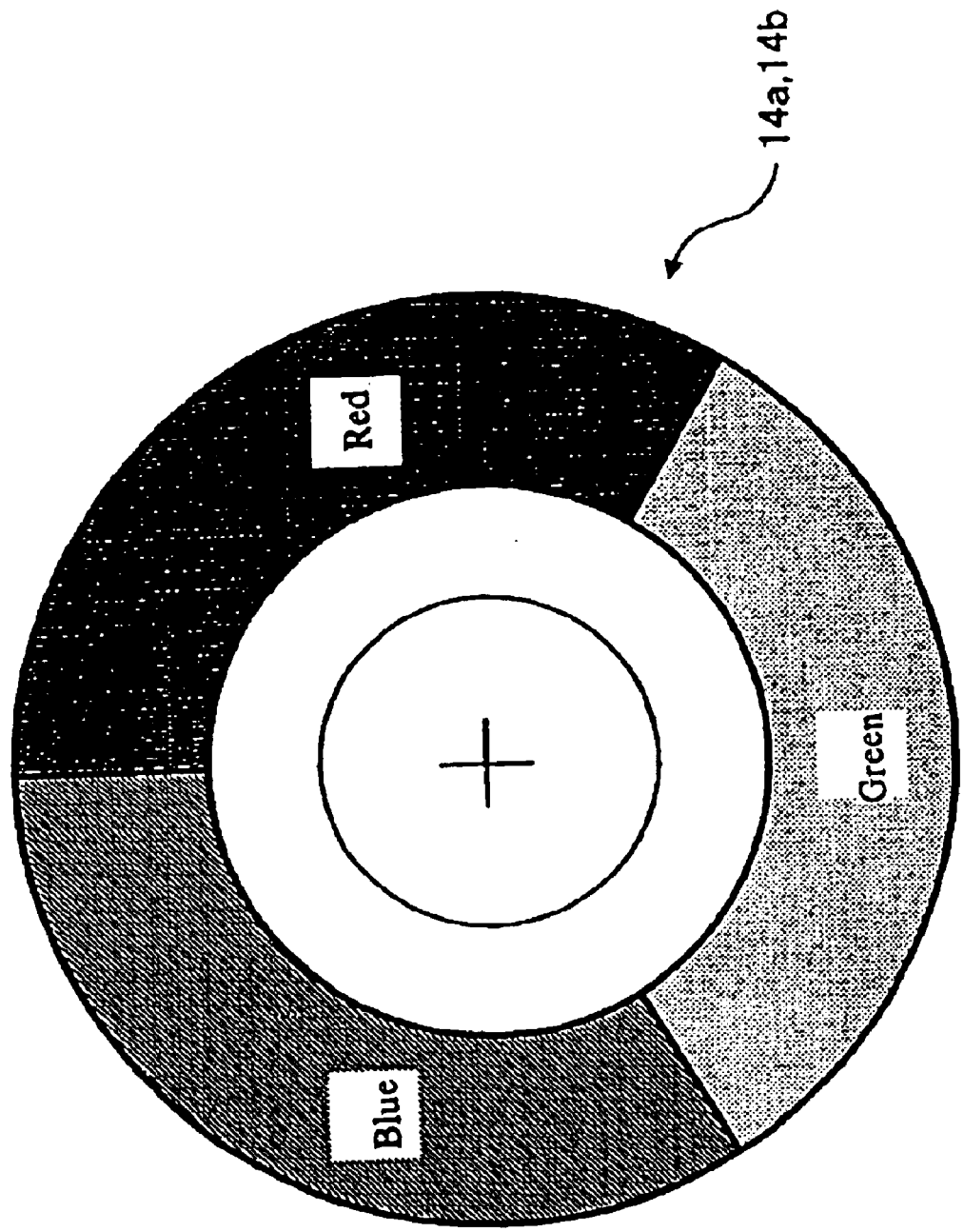

[Figure 3]
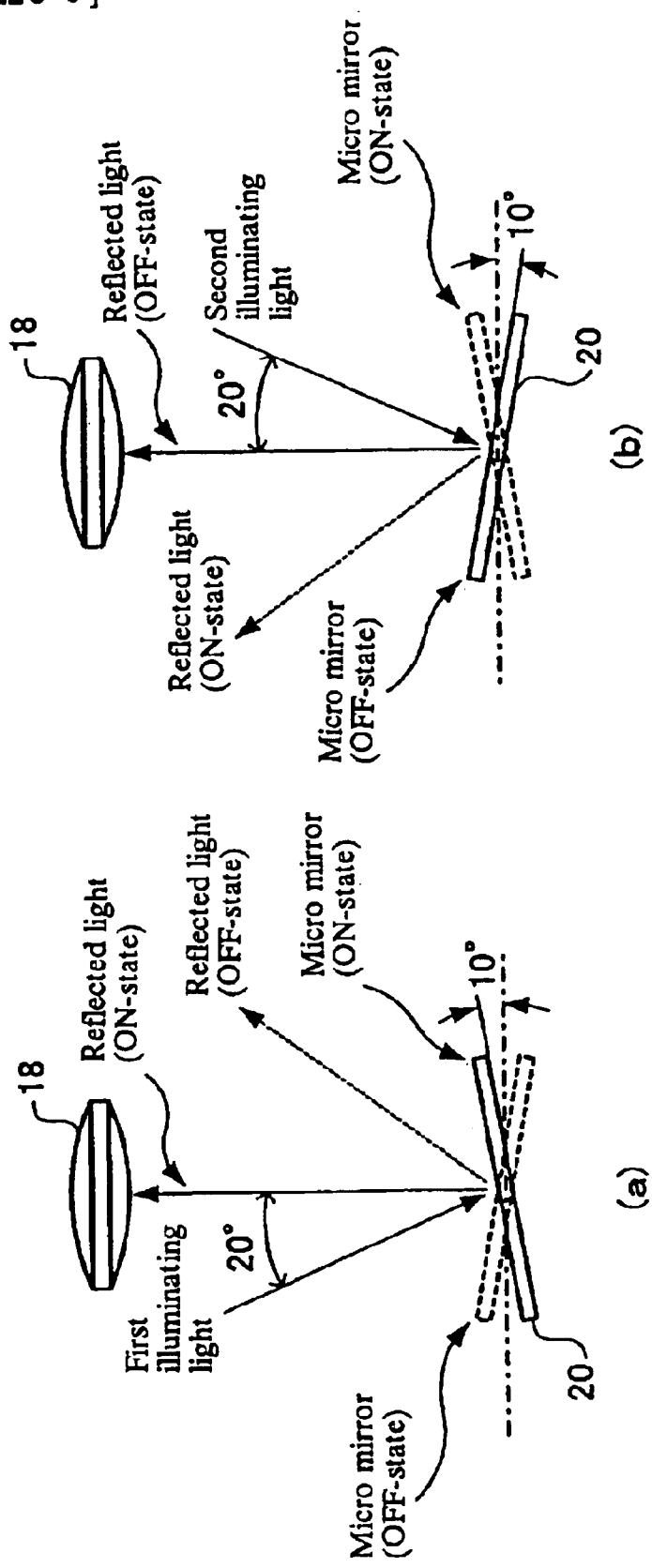

[Figure 4]
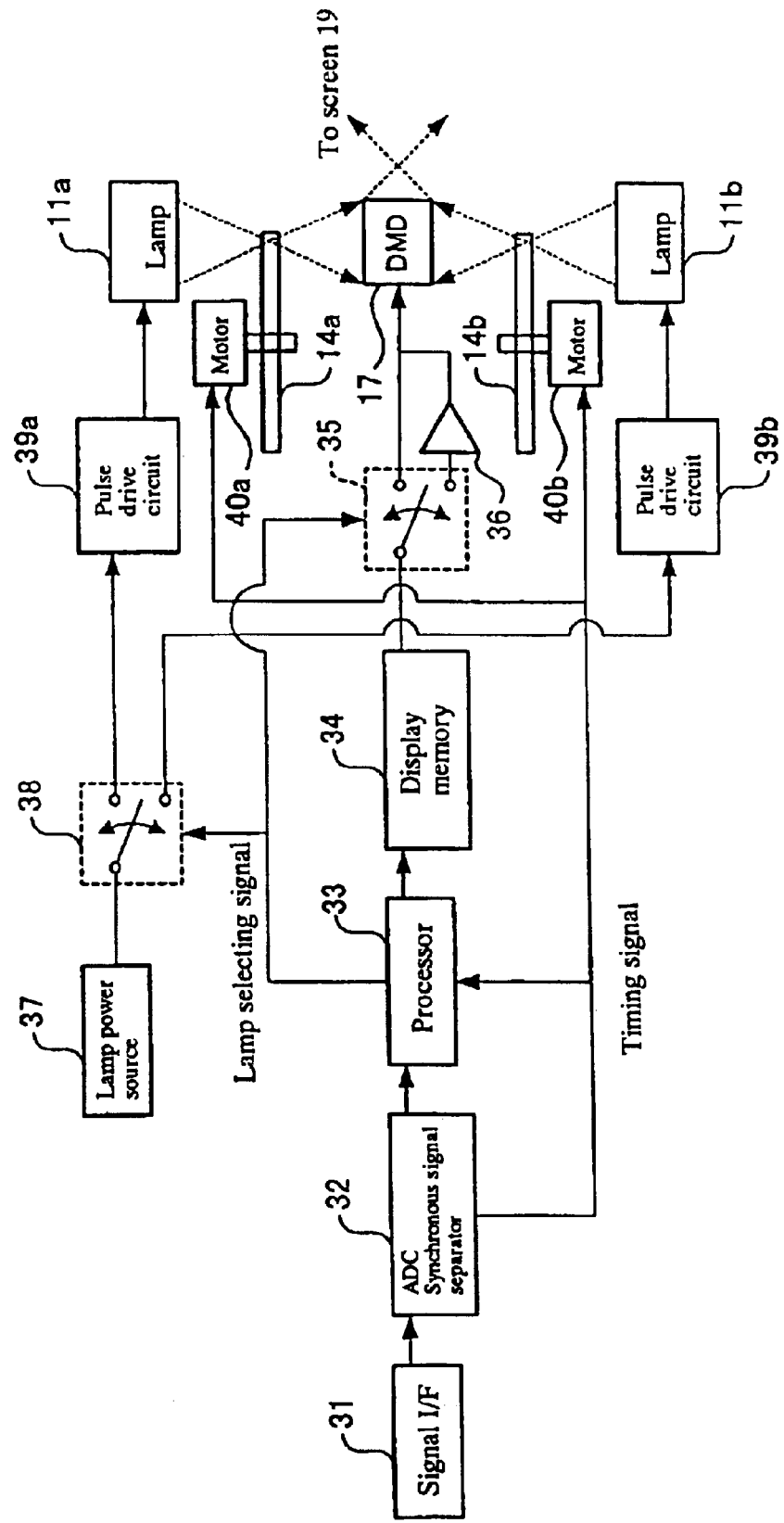

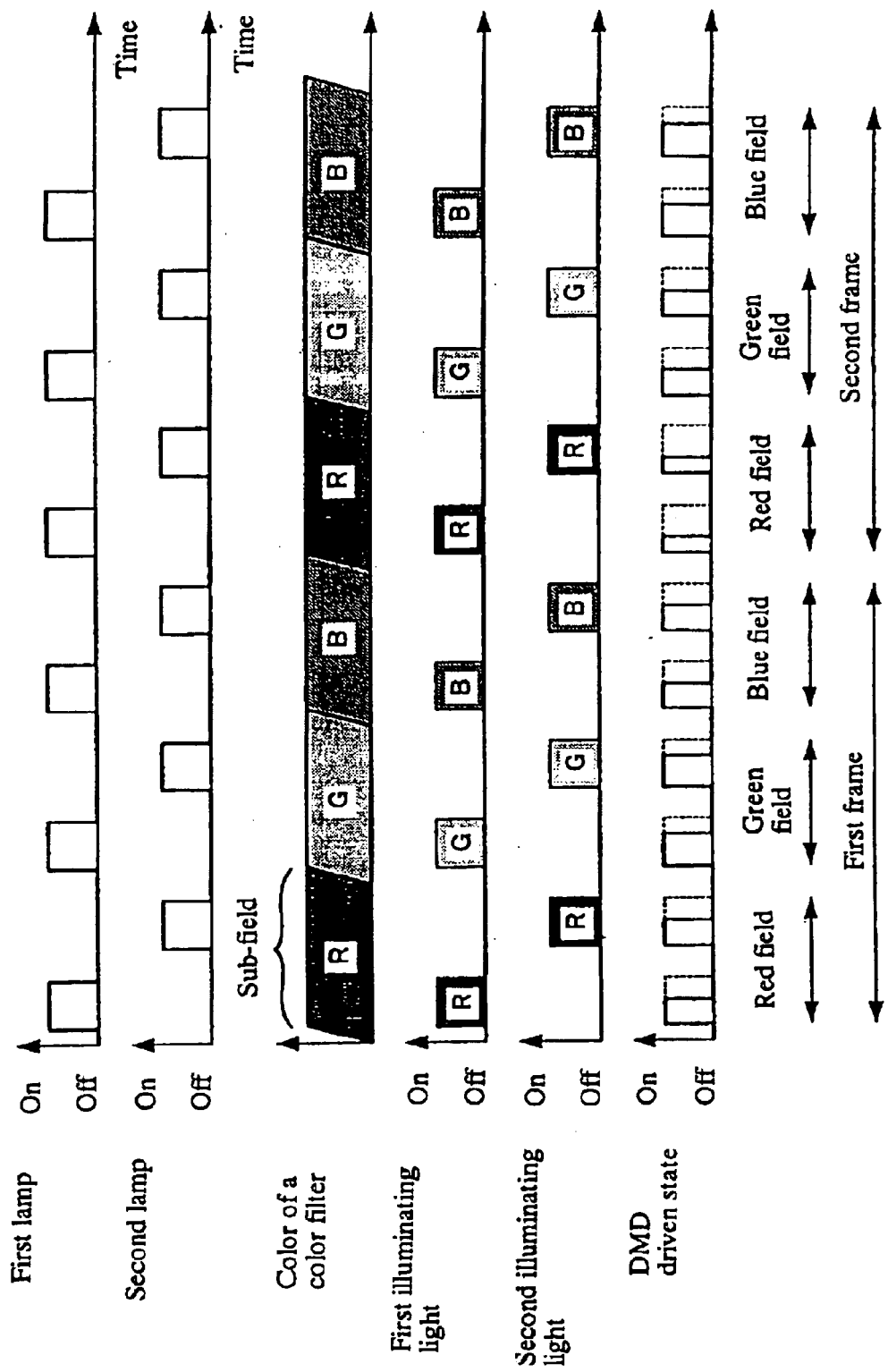
[Figure 5]

[Figure 6]
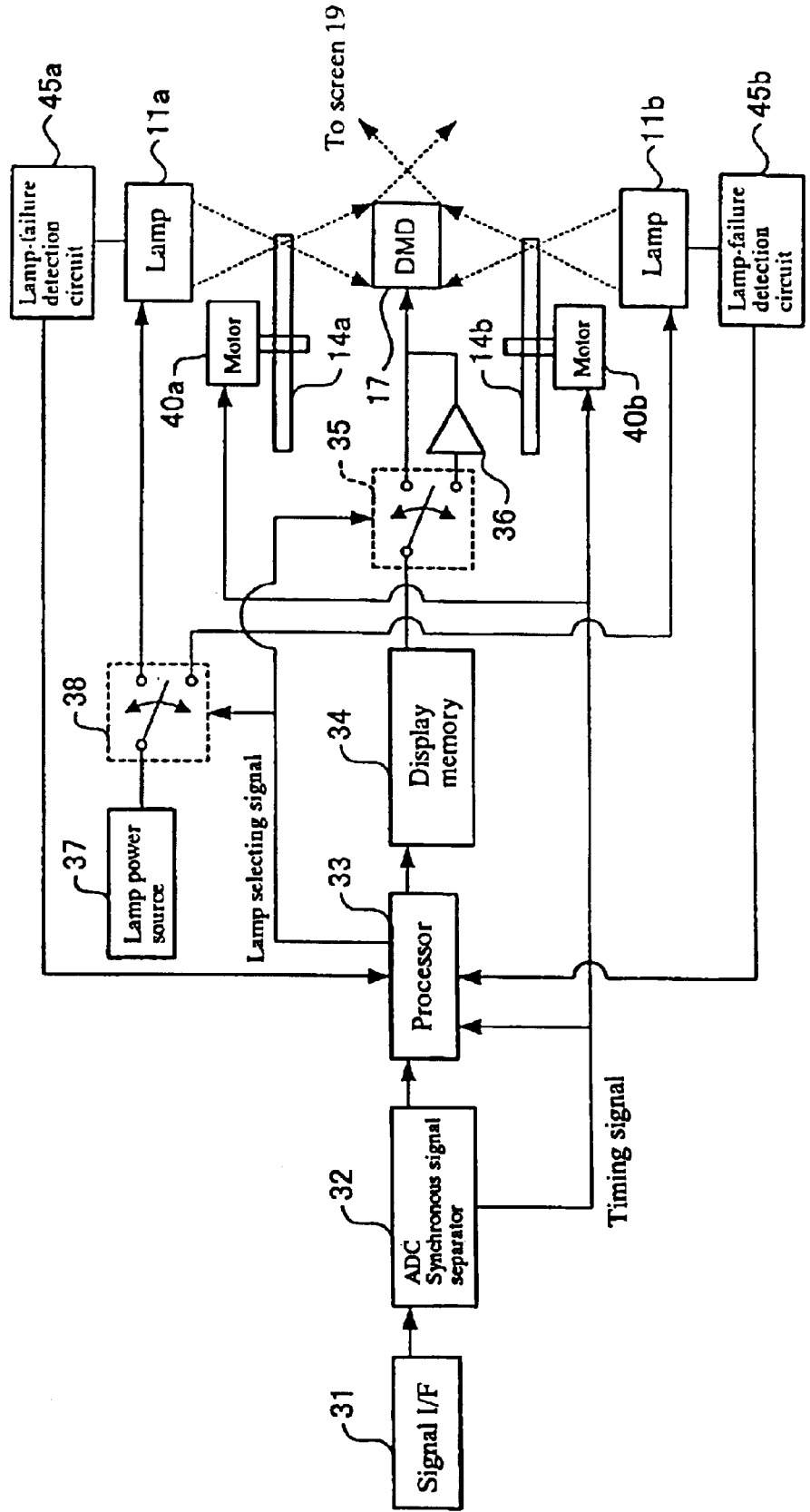

[Figure 7]
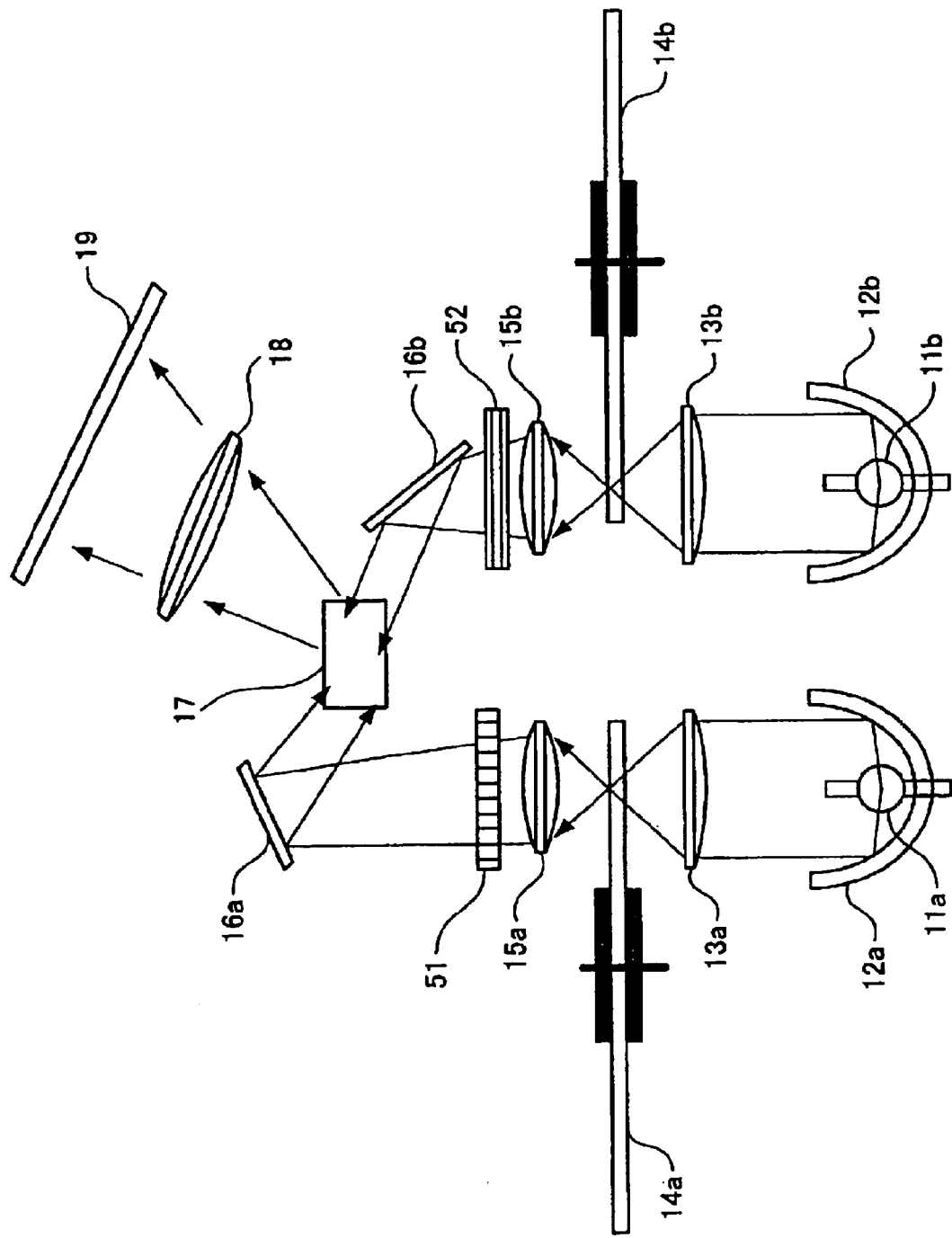

[Figure 8]
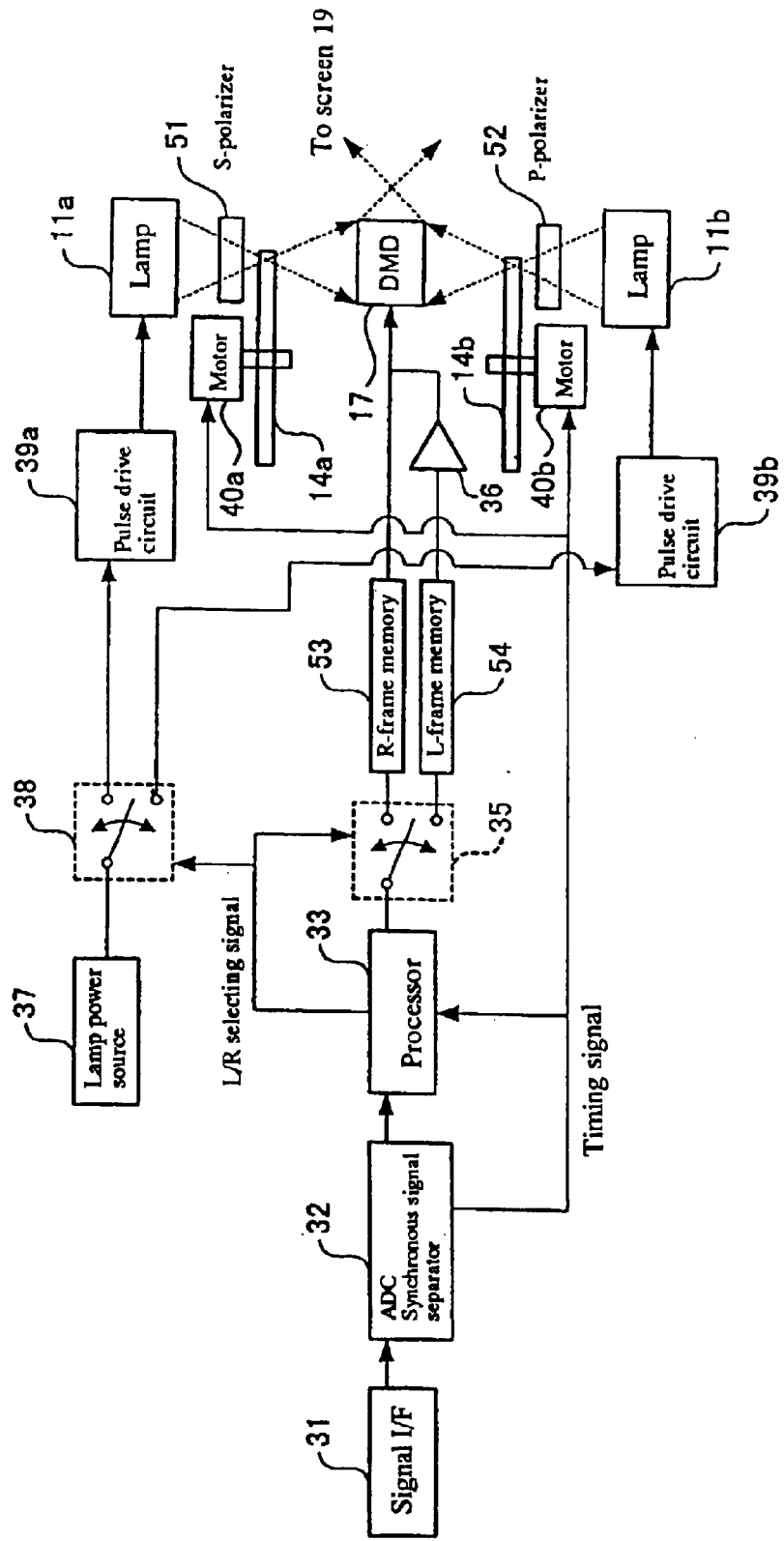

[Figure 9]
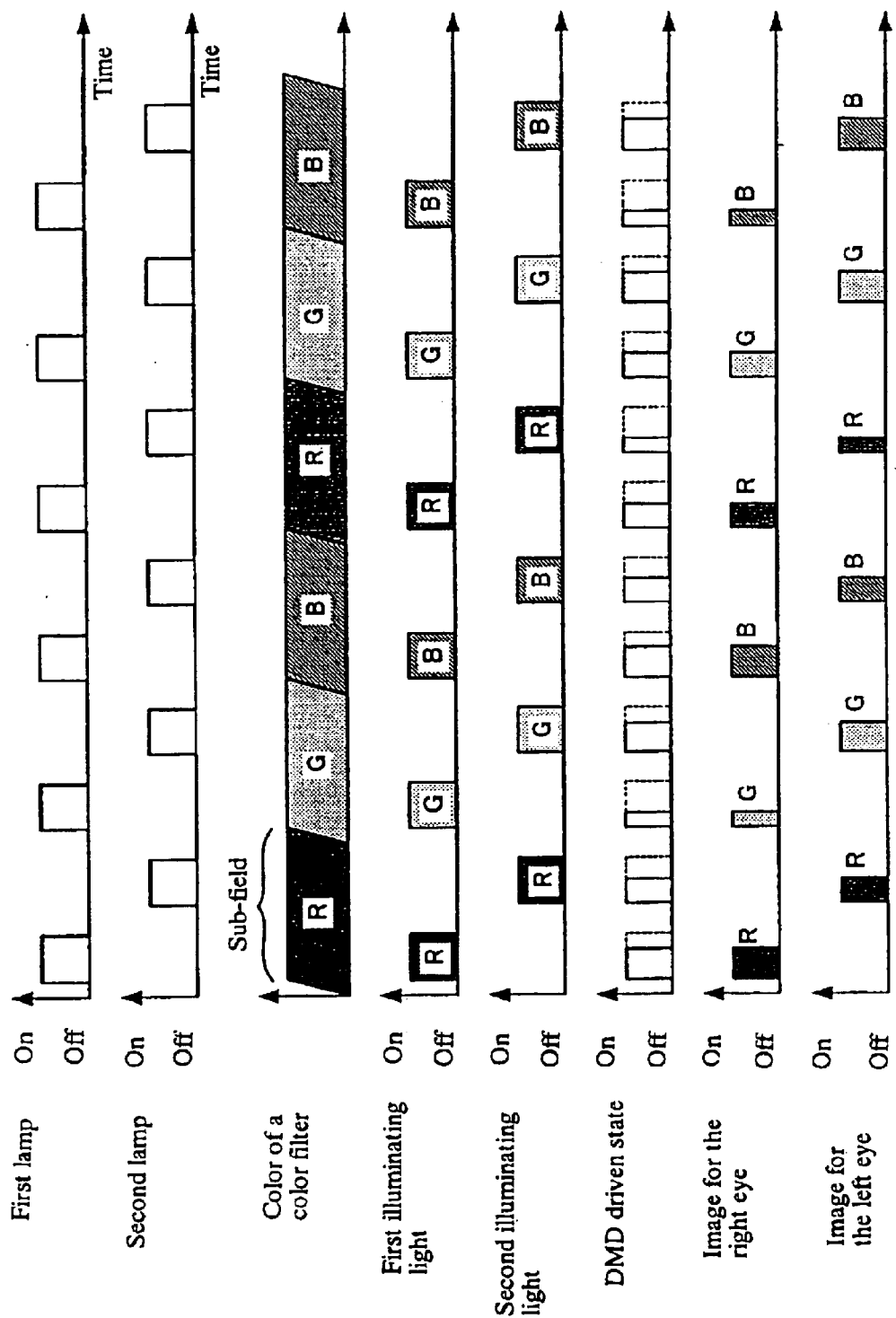

[Figure 10]
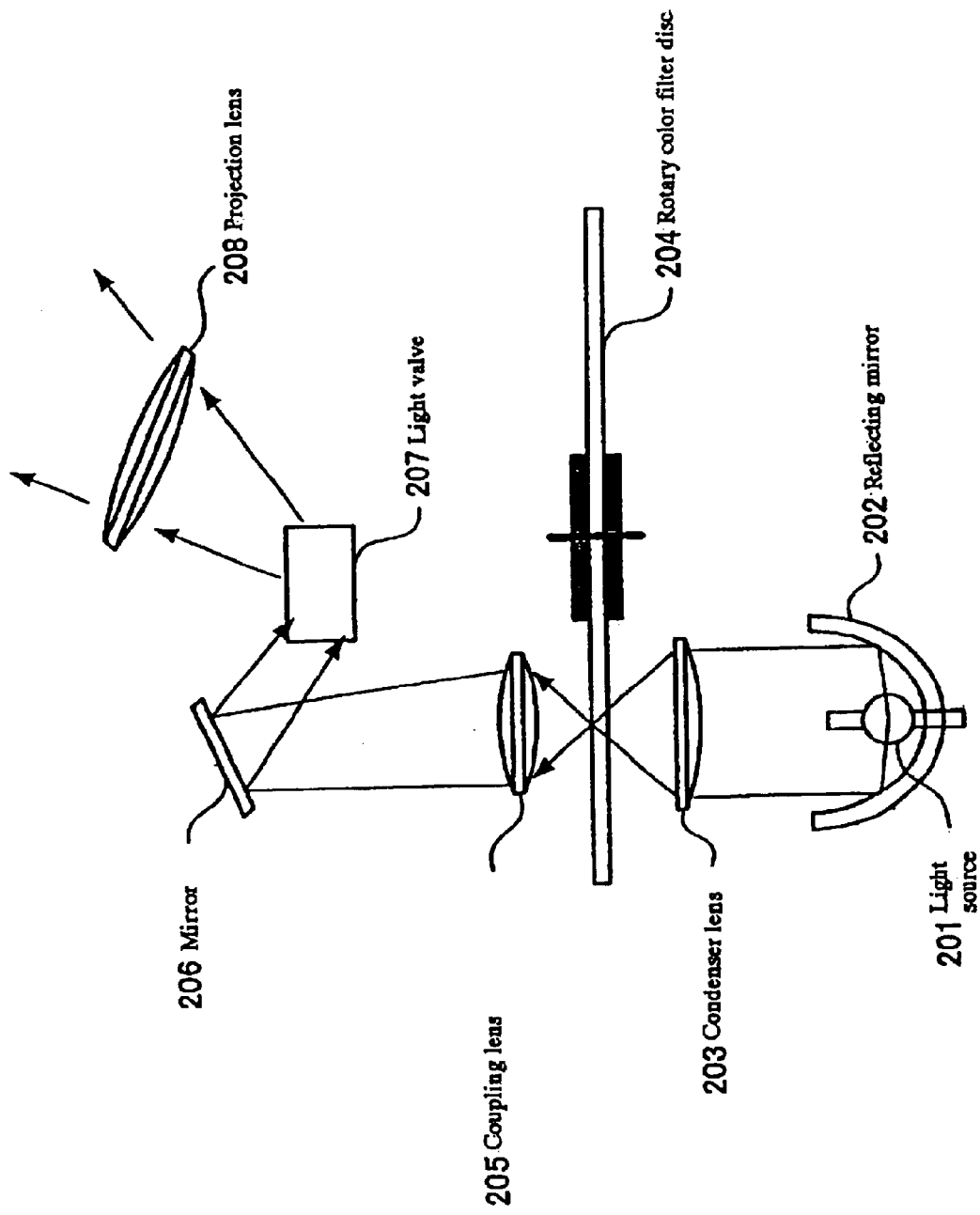

[Figure 11]
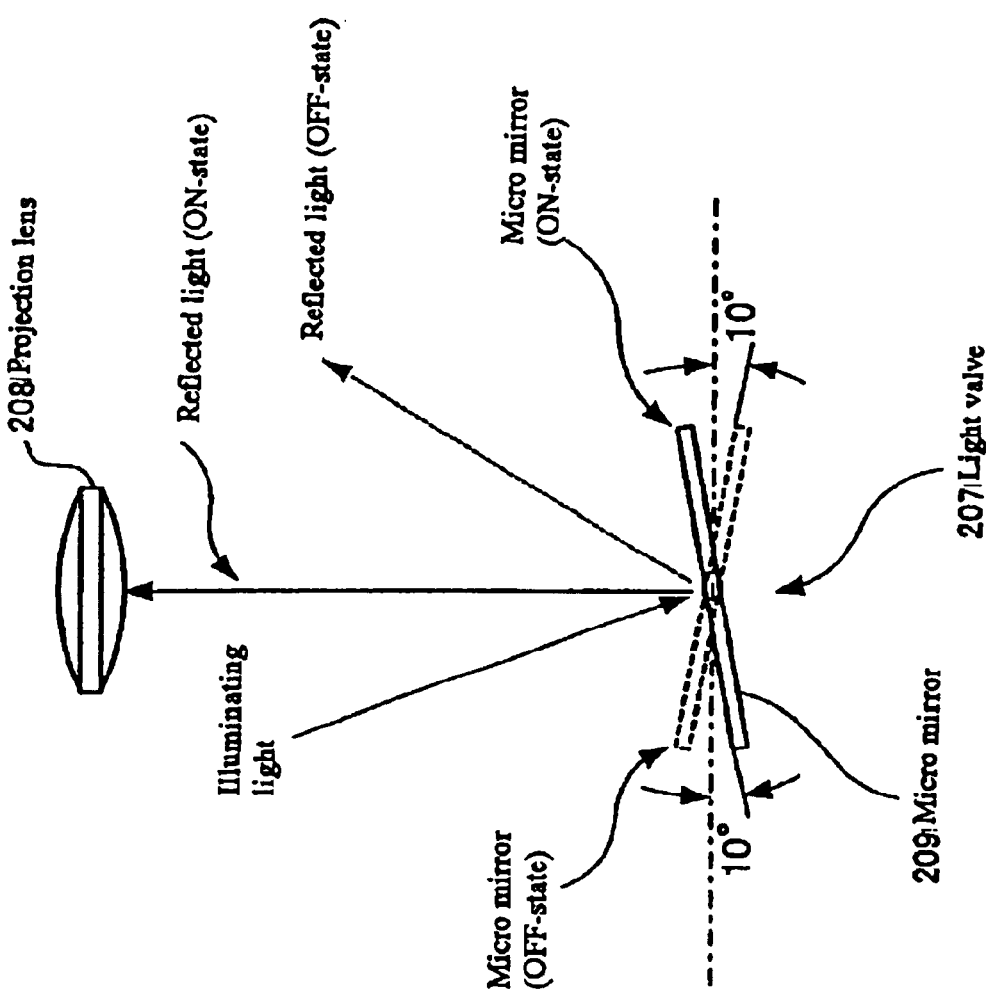

[Figure 12]
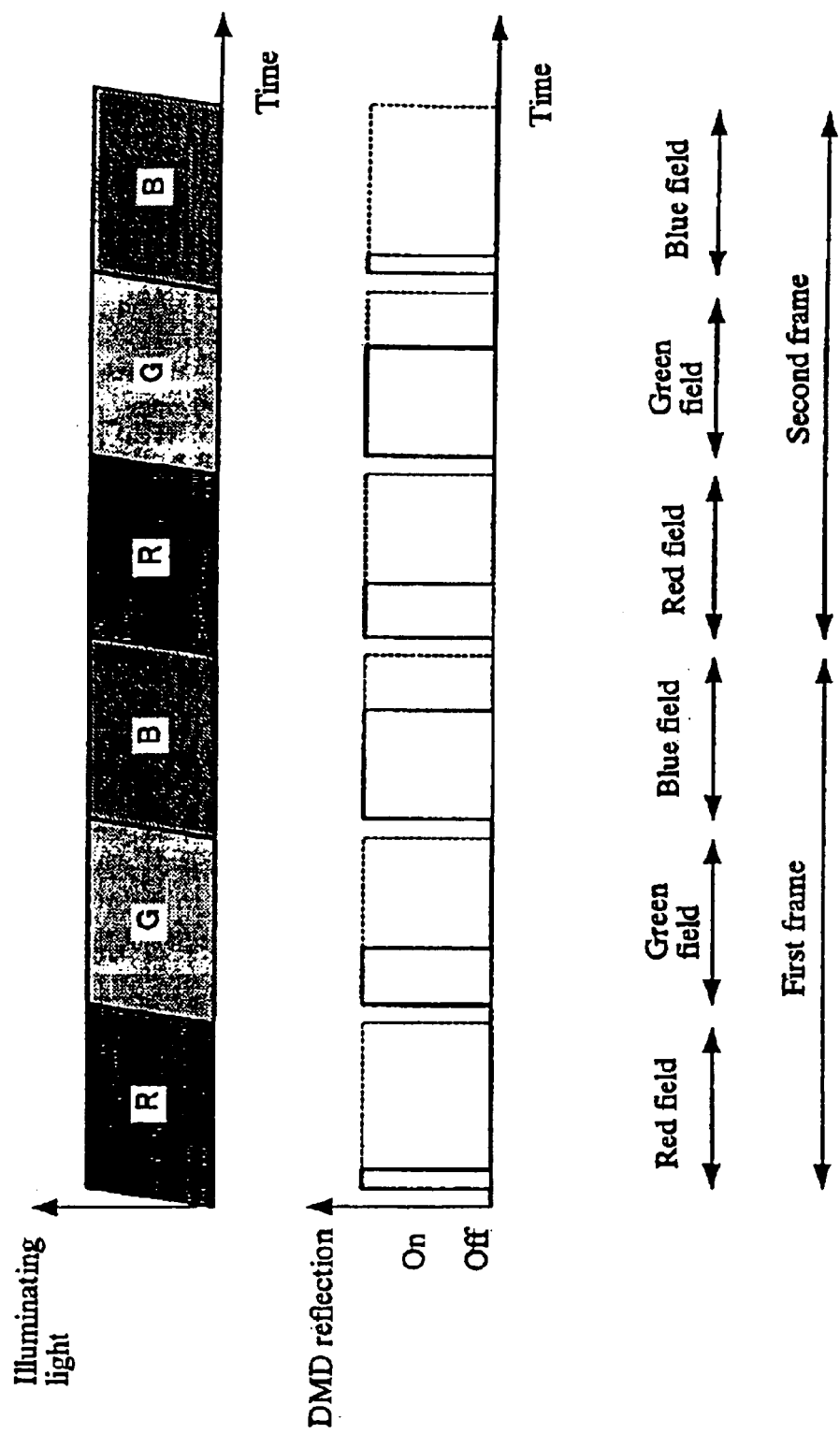

[Figure 13]
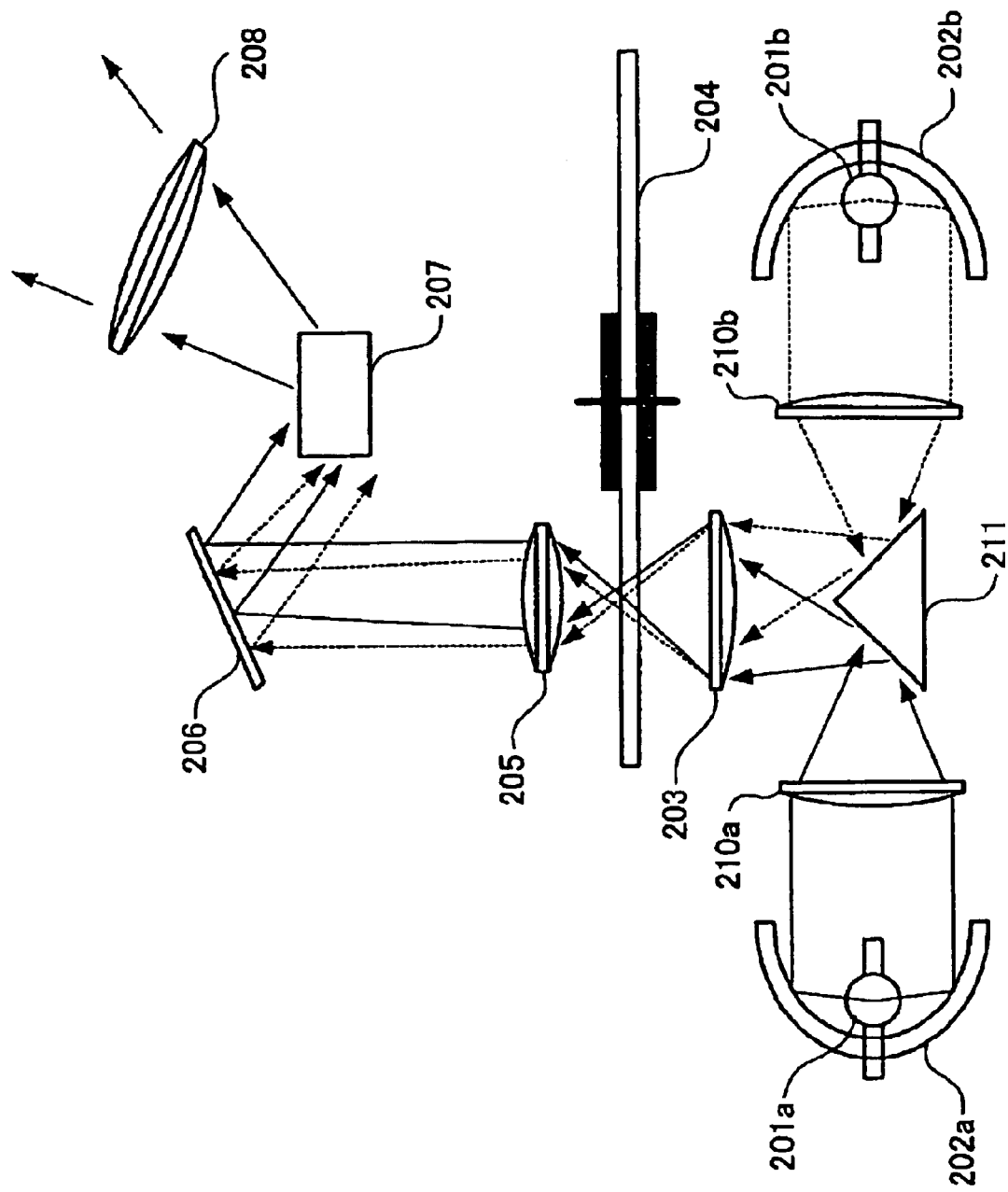

ILLUMINATING-LIGHT CONTROLLER, PROJECTOR, AND ILLUMINATING-LIGHT CONTROL METHOD

FIELD OF THE INVENTION

The present invention relates to applications of a spatial light modulator that employs an array of micro mirrors represented by a digital micro-mirror device (DMD), and more particularly to an illuminating-light controller, such as a projector with a plurality of light sources, etc., and an illuminating-light control method.

BACKGROUND OF THE INVENTION

There has recently been an ever-increasing demand for large-screen display devices for the display of images and monitoring, such as personal computers (PCs), televisions, etc. Projection type displays, which are three-panel type projectors using three light valves (liquid crystal panels), have rapidly spread in use because they are higher in luminance and smaller in size, lighter in weight, and lower in cost, compared with projection type displays using CRTs, which were conventionally the trend. However, the light valve is expensive, and a projector using three expensive light valves becomes very high in cost as a whole. Furthermore, this type of projector has an increased size because of the optical system is complicated.

On the other hand, a color-sequential display type has been provided in which a high-speed light valve is used. Light with three primary colors is sequentially projected at high speeds, having field images with each color are displayed in sequence. Full color frames are displayed by exploiting an afterimage on the eye. FIG. 10 is a diagram showing the rough schematic drawing of a color-sequence display type of projector employing a digital micro mirror device as a light valve. First, white light emitted from a light source 201 is converted to parallel light by a reflecting mirror 202 and is directed to a rotary color filter disc 204 through a condenser lens 203. The light beam with three primary colors, red (R), green (G), and blue (B), generated by the rotary color filter disc 204, is irradiated to a light valve 207 through a coupling lens 205 and a mirror 206. The light valve 207 employs a DMD for changing the direction of reflected light by controlling the inclination of a micro mirror that is a reflecting surface. The light, irradiated by the light valve 207 tilted when it is in an ON state, is incident on a projection lens 208 and projected on a screen (not shown).

FIG. 11 is a diagram showing the operational principles of the DMD employed as the light valve 207. The white light emitted from the light source 201 is reflected by the micro mirror 209 and incident on the projection lens 208. The micro mirror 209 is constructed to tilt about 10 degrees clockwise or counterclockwise. When the micro mirror 209 is in an ON state indicated by a solid line in FIG. 11, the reflected light is incident on the projection lens 208. When it is in an OFF state indicated by a broken line, the reflected light is not incident on the projection lens 208. Thus, by controlling the time of the ON state or OFF state in which the micro mirror 209 tilts, it is possible to adjust the quantity of light projected. As a result, light modulation can be performed.

FIG. 12 is a diagram for explaining the timing at which a color-sequence display type is performed. As shown in the upper part of FIG. 12, for the illuminating light passed through the rotary color filter disc 204, R-, G-, and B-fields are repeatedly outputted for each frame as time goes by. The light valve 207 controls the ON-state of the micro mirror 209, based on input video data. For example, the light valve 207 operates so that illuminating light is incident on the projection lens 208 only for a period indicated by a solid line in the intermediate part of FIG. 12. As a result, R-, G-, and B-images are optically modulated and sequentially displayed. This color-field sequential type of projector (hereinafter called a single-panel type projector) is smaller in size, lighter in weight, and lower in cost, compared with a liquid crystal type of projector using three light valves, for instance, and is widely being used as a portable projector of small size for business.

For example, Published Unexamined Patent Application No. 10-153755 discloses a technique wherein, in order to vary and output the polarizing angles of respective projected images for the left and right eyes, light from a white light source is focused on a rotary polarizing color filter, the light serially modulated in the order of R, G, and B through the color filter is directed to a DMD, and the reflected light modulated to an image corresponding to each color by the DMD is projected on a screen by a projection lens. In the technique disclosed in such a publication, however, brightness is perceptibly reduced by polarization and sufficient luminance cannot be obtained. In addition, because a polarizing panel that rotates at high speeds is employed, the polarizing surface will tilt and that lateral separation will become unsatisfactory.

SUMMARY OF THE INVENTION

The present invention has been made in order to solve the aforementioned problems. Accordingly, it is an object of the present invention to eliminate loss due to a coupling optics, for superposing lights, even when using a plurality of lamps, and to ensure approximately twice as much brightness.

A first feature of the present invention includes an illuminating-light controller comprising a light modulator for projecting light on a corresponding area by tilting a reflecting surface. A first light source emits a first light that is projected on the corresponding area by illuminating the first light to the reflecting surface of the spatial light modulator being tilted at a first angle. A second light source for emits a second light that is projected on the corresponding area by illuminating the second light to the reflecting surface of the light modulator being tilted at a second angle. Still further included is a control section for controlling the first light emitted from the first light source and the second light emitted from said second light source.

Another feature of the present invention includes an illuminating-light controller comprising a micro mirror type spatial light modulator to project light, emitted from a light source, on a corresponding area by tilting a reflecting surface. A first light source emits a first light, which is projected on the corresponding area, by illuminating the first light to the reflecting surface of the spatial light modulator tilted at a first angle. A second light source emits a second light, which is projected on the corresponding area, by illuminating the second light to the reflecting surface of the spatial light modulator tilted at a second angle. Finally, a control section controls the first light emitted from the first light source and the second light emitted from the second light source.

In accordance with another important aspect of the invention, there is provided a projector comprising a first light source to emit light in pulse form, and a second light source to emit light in pulse form. The first light source and the second light source are switched alternately. A spatial light modulator is equipped with a micro mirror being tiltable to a first angle and then to a second angle. The light modulation is performed by the tilting of the micro mirror. A projection lens receives incident light reflected by the micro mirror of the spatial light modulator. Further aspects of the invention include a control section for controlling the first light source so that the light emitted from the first light source is modulated and directed to the projection lens when the micro mirror is tilted at the first angle, and for controlling the second light source so that the light emitted from the second light source is modulated and directed to the projection lens when the micro mirror is tilted at the second angle.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIG. 1 is a diagram showing the optical system of a projector as an illuminating-light controller in a first embodiment of the present invention.

FIG. 2 is a diagram showing the schematic drawing of the rotary color filter disc shown in FIG. 1.

FIG. 3 is a diagram for explaining the relationship in the first embodiment between the illuminating light incident on the light valve and the light reflected at the micro mirror.

FIG. 4 is a block diagram for explaining the control operation in the first embodiment.

FIG. 5 is a diagram for explaining the timing at which a color-sequence display type in the first embodiment is performed.

FIG. 6 is a block diagram for explaining the control operation in a second embodiment of the present invention.

FIG. 7 is a diagram showing the optical system of a projector that is an illuminating-light controller in a third embodiment of the present invention.

FIG. 8 is a block diagram for explaining the control operation in the third embodiment.

FIG. 9 is a diagram for explaining the timing at which a three-dimensional image is displayed according to the third embodiment.

FIG. 10 is a diagram showing the rough schematic drawing of a color-sequence display type of projector employing a digital micro mirror device (DMD) as a light valve.

FIG. 11 is a diagram showing the operational principles of the DMD employed as the light valve.

FIG. 12 is a diagram for explaining the timing at which a color-sequence display type is performed.

FIG. 13 is a diagram showing an example of a single-panel type projector employing two illuminating lights.

DETAILED DESCRIPTION OF THE INVENTION

This invention will hereinafter be described in detail, based on embodiments shown in the accompanying drawings.

In both the three-panel type projector and single-panel type projector, the development of projectors with higher luminance has advanced, since there is a demand for projection on a larger screen or a demand for viewing a projected image with an illuminator in a lighted room. To raise luminance on this projection. screen, the wattage of the light source lamp can be simply raised. However, if the lamp wattage is simply raised, the lifetime and reliability of the lamp will be considerably reduced and therefore raising the lamp wattage is not practical. In addition, the additional necessity for developing lamps with a high wattage will occur.

To increase the lamp wattage, a method of increasing the gap (arc gap) between the electrodes to ensure the lifetime and reliability is generally employed. However, if this arc gap becomes larger, the illuminant of the light source becomes greater and the efficiency at which light is focused on the light valve is reduced. For instance, when a luminance of 1000 lumen is obtained in a single-panel type projector using a metal halide lamp of 200 W, the luminance is enhanced only 40%, even if a lamp of 400 W whose wattage is twice of 200 W is used.

On the other hand, if the luminance can be enhanced by using two existing lamps instead of doubling the wattage, the labor and cost for the development of lamps can be saved. In addition, the cycle of an exchange of lamps can be doubled by adding a function of using lamps one by one and switching to the second lamp when the first lamp reaches its lifetime or fails. This is particularly important in operating environments where lamps are assembled into a rear projection box, in which lifetime is required, or installed on ceilings, etc.

FIG. 13 is a diagram showing an example of a single-panel type projector employing two illuminating lights. The lights from a first lamp 201*a* and a second lamp 201*b* are converted to parallel lights by a first reflecting mirror 202*a* and a second reflecting mirror 202*b* and are superposed by a coupling optics 211 through a first condenser lens 210*a* and a second condenser lens 210*b*, and are directed to a third condenser lens 203. In this projector, the illuminating lights are superposed by shifting the center or inclination of each illuminating light.

However, since the arc gap in the projector is finite, the size of the illuminant of the light source is not negligible and the two illuminating lights cannot be completely superposed and utilized. Because the high luminance parts, for example, 75% of the central portions of the illuminating lights from the lamps 201*a*, 201*b* are superposed by the coupling optics 211, the luminance is enhanced only 50%, compared with the case of a single lamp.

On the other hand, the cycle of an exchange of lamps can be doubled by adding the function of using the lamps one by one and switching to the second lamp 201*a* when the first lamp 201*a* reaches its lifetime or fails, but since only 75% of a light beam can be taken out by the coupling optics 211 even in the case of a single lamp, the projector with the switching function becomes darker, compared with a projector designed to use a single lamp.

Another object of the invention is to eliminate loss due to the coupling optics and to ensure the brightness of a single lamp, by switching a first lamp to a second lamp even when the first lamp fails because of its lifetime, etc., and to make the cycle of an exchange of lamps approximately twice.

Still another object of the invention is to apply to displaying a three-dimensional image by polarizing the light from the first lamp and the light from the second lamp in different manners.

If the control section controls the first and second light sources so that they are alternately driven to emit light, it is preferable in that it becomes possible to ensure approximately twice as much brightness, compared with the case where each light source emits light separately. Particularly, if each light source is constructed to emit light in pulse form, it becomes possible to ensure lighter light, compared with the case where each light source is always switched on, and lamp lifetime can be expected to become longer.

The aforementioned corresponding area refers to a projection lens, a display surface, etc. Also, the spatial light modulator can employ a digital micro mirror device (DMD).

The illuminating-light controller may further comprise: a first polarizing optics, provided in an optical path along which the light emitted from the first light source reaches the reflecting surface of the spatial light modulator, for polarizing the light in a specific direction. A second polarizing optics, is also provided in an optical path along which the light emitted from the second light source reaches the reflecting surface of the spatial light modulator, for polarizing the light in a direction different from the specific direction. If the controller is constructed in this manner, it is capable of displaying a three-dimensional image. If a viewer has eye ware having polarizing panels, only light polarized in a vertical direction is transmitted the right eye and light polarized in a horizontal direction is transmitted the left eye.

The illuminating-light controller may still further comprise a failure detecting section for detecting failure of the first light source. In this case, the control section drives the second light source to emit light if the failure detecting section detects the failure of the first light source. Even in the event the lamp fails, the viewer can continue to view an image. In addition to keeping the second light source in standby, and when the failure detecting section detects the failure of the first light source switching on the second light source, the first and second light sources can be switched on alternately and, when the first light source fails, only the second light source can be switched on.

Furthermore, the first light source and the second light source may be alternately driven to emit light during a sub-field provided for each color in a frame forming a specific image. If constructed in this way, at a sub-field of each color field formed for each of the three primary colors (R, G, and B) it becomes possible to perform light modulation by employing the first light source and the second light source.

In accordance with still another important aspect of the present invention, there is provided a projector comprising: a first light source; a second light source provided separately from the first light source; a detection section for detecting an abnormal state of a first light source; a spatial light modulator equipped with a micro mirror tiltable to a first angle and a second angle, light modulation being performed by tilt of the micro mirror; and a projection lens on which the light reflected by the micro mirror of the spatial light modulator is incident; wherein the spatial light modulator directs light, emitted from the first light source, to the projection lens with the micro mirror tilted at the first angle, and, in the case that an abnormal state of the first light source is detected by the detection section also directs light, emitted from the second light source, to the projection lens with the micro mirror tilted at the second angle. Accordingly, even when the first light source reaches its expected lifetime, the apparent lifetime can be doubled by switching between the first light and second light sources. Furthermore, a reduction in the brightness of an image projected can be prevented by projecting light with the use of the first and second angles of the micro mirror.

In accordance with a further important aspect of the present invention, there is provided a method for directing first illuminating light from a first light source and second illuminating light from a second light source, to a projection lens by tilting a micro mirror of a spatial light modulator to reflect the first illuminating light and the second illuminating light at the micro mirror, the method comprising the steps of: directing the first illuminating light to the projection lens by tilting the micro mirror at a first angle to reflect the first illuminating light at the micro mirror; and directing the second illuminating light to the projection lens by tilting the micro mirror at a second angle to reflect the second illuminating light at the micro mirror.

In the aforementioned method, the first light source and the second light source can be alternately switched on so that each light source emits light in pulse form.

In addition, in the aforementioned method, only the first light source can be switched on with the second light source being on standby, and the second light source can be switched on if an abnormal state of the first light source is detected.

In accordance with a further important aspect of the present invention, there is provided a method for directing light with three primary colors to a projection lens by employing a spatial light modulator which has a first state in which a micro mirror is tilted at a first angle and a second state in which the micro mirror is tilted at a second angle, the method comprising the steps of: constructing three color fields for each frame forming an image by the light with three primary colors; and directing light, modulated by employing the first state of the spatial light modulator, and light, modulated by employing the second state of the spatial light modulator, to the projection lens for each of the three color fields.

In the aforementioned method, light modulation employing the first state is performed during the time the micro mirror is tilted at the first angle, and light modulation employing the second state is performed during the time the micro mirror is tilted at the second angle.

In addition, incidence angles of the light with three primary colors on the spatial light modulator can be differentiated between the case of the light modulation employing the first state and the case of the light modulation employing the second state. In such a case, it becomes possible to direct the reflected light to the projection lens without a reduction in the efficiency.

Furthermore, the light modulation employing the second state may be inverted in polarity from the ON/OFF light modulation employing the first state. Even in the case of employing each angle of the micro mirror, light modulation can be simply executed. Again referring to the drawings, FIG. 1 is a diagram showing the optical system of a projector that is an illuminating-light controller of this embodiment. Reference numeral 11a denotes a first lamp (first light source), the lamp consisting of a metal halide or high-pressure mercury lamp, etc.; reference numeral 11b denotes a second lamp (second light source), the lamp consisting of a metal halide or high-pressure mercury lamp, etc. Reference numeral 12a denotes a first reflecting mirror, the mirror converting white light, emitted from the first lamp 11a, to parallel light by its parabolic surface; reference numeral 12b denotes a second reflecting mirror, the mirror converting white light, emitted from the second lamp 11b, to parallel light by its parabolic surface. Reference numeral 13a denotes a first condenser lens for converging the parallel light reflected by the first reflecting mirror 12a; reference numeral 13b denotes a second condenser lens for converging the parallel light reflected by the second reflecting mirror 12b.

Reference numeral 14a denotes a first rotary color filter disc and 14b a second rotary color filter disc. FIG. 2 shows the schematic drawing of the rotary color filter discs. 14a, 14b. The first and second rotary color filter discs 14a, 14b are equipped with red (R), green (G), and blue (B) filters and rotate on their center axes. This rotation makes one revolution for each frame, which is a video signal of 60 Hz, for example, and the white lights from the first and second lamps 11a, 11b can be modulated within each of the R-, G-, and B-fields which are sub-fields.

The reference numeral 15a shown in FIG. 1 denotes a first coupling lens and 15b a second coupling lens. The reference numeral 16a is a first mirror, 16b a second mirror, and 17 a light valve. The light beams with three primary colors, red (R), green (G), and blue (B), generated by the first and second rotary color filter discs 14a and 14b, are irradiated to the light valve 17 by the first coupling lens 15a, the second coupling lens 15b, the first mirror 16a, and the second mirror 16b. This light valve 17 employs a digital micro mirror device (DMD) that changes the direction of reflected light by controlling the tilt of a micro mirror (to be described later) having a reflecting surface. The light reflected by this light valve 17 is incident on the projection lens 18 and then is projected on a screen 19.

FIGS. 3A and 3B are diagrams for explaining the relationship in the first embodiment between the illuminating light incident on the light valve 17 and the light reflected at the micro mirror. In the DMD employed in the light valve 17, the micro mirror 20 is driven by electrostatic force and has two stable positions tilted clockwise and counterclockwise by about 10 degrees around its axis of rotation. As shown in FIG. 3A, the first illuminating light that is incident from the first mirror 16a on the micro mirror 20 of the DMD, is incident at an angle of 20 degrees from the upper left. When the micro mirror 20 is tilted counterclockwise by 10 degrees, as in an "ON-state" shown in FIG. 3A, the first illuminating light is reflected in a direction perpendicular to the DMD, is incident on the projection lens 18, and is projected on the screen 19. When the micro mirror 20 is tilted clockwise by 10 degrees, as in an "OFF-state" shown by a broken line in FIG. 3A, the first illuminating light is reflected at a large angle in the right direction, is not incident on the projection lens 18, and is not projected on the screen 19.

Similarly, as shown in FIG. 3B, the second illuminating light that is incident from the second mirror 16b on the light valve 17 is incident at an angle of 20 degrees from the upper right. When the micro mirror 20 is tilted counterclockwise by 10 degrees, as in the OFF-state shown in FIG. 3B, the second illuminating light is reflected in the direction perpendicular to the DMD, is incident on the projection lens 18, and is projected on the screen 19. When the micro mirror 20 is tilted clockwise by 10 degrees, as in the ON-state shown by a broken line in FIG. 3B, the second illuminating light is reflected at a large angle in the left direction, is not incident on the projection lens 18, and is not projected on the screen 19. For the second illuminating light, an appropriate image can be obtained by inputting a signal, inverted in ON/OFF polarity, to the micro mirror 20.

Thus, the first embodiment is equipped with another illuminating system, which consists of a light source and an illuminating optics, unlike the conventional single-panel type DMD projector. Moreover, two different illuminating lights are projecting on the screen 19, by making use of the two stable positions of the micro mirror 20 of the DMD used as the light valve 17. Consequently, even in the event of employing the first lamp 11a and the second lamp 11b, it becomes possible to ensure a sufficient quantity of light without the occurrence of loss due to the coupling optics.

FIG. 4 is a block diagram for explaining the control operation in the first embodiment. Reference numeral 31 denotes a signal interface (I/F), through which a television signal such as a national television system committee (NTSC) signal, or a video signal from a computer, etc., is input. Reference numeral 32 denotes an A/D converter, which converts an input analog signal to a digital signal and separates a vertical/horizontal synchronous signal. Reference numeral 33 denotes a processor, which executes the entire control of components in the first embodiment. Reference numeral 34 denotes display memory, which develops, for example, data separated for each R, G, and B, for each frame. Reference numeral 35 denotes a switching circuit, which is constructed to switch the first state shown in FIG. 3A and the second state shown in FIG. 3B. Reference numeral 36 denotes an inverter, which inverts either ON-polarity or OFF-polarity so that the first state and the second state are obtained.

Reference numeral 37 denotes a lamp power source, which supplies power to the first and second lamps 11a and 11b that consist of a metal halide or high-pressure mercury lamp. This lamp 37 is composed of a starter circuit for generating a pulse signal of a few KV to initially switch on the lamp 11a or 11b, and a ballast for keeping the starter circuit stable after discharging has been started. Since the starter circuit is relatively expensive, it is constructed such that after sequentially switching on the lamps, it can be switched to the ballasts of the respective lamps. Reference numeral 38 denotes a switching circuit, which switches power supplied from the lamp power source 37, based on a lamp selecting signal from the processor. Reference numeral 39a denotes a first pulse drive circuit which pulse-drives the first lamp 11a. Reference numeral 39b denotes a second pulse drive circuit, which is shifted from the first pulse drive 39a by a half phase and pulse-drives the second lamp 11b. Reference numeral 40a denotes a first motor for continually rotating the first rotary color filter disc 14a. Likewise, reference numeral 40b denotes a second motor for continually rotating the second rotary color filter disc 14b.

The first rotary color filter disc 14a and the second rotary color filter disc 14b, as described previously, are constructed to make one revolution for each frame in synchronization with an input video signal. For example, in the case where a video signal of 60 Hz is input, the color filter disc makes 60 revolutions per second. The lights transmitted through the first and second rotary color filter discs 14a, 14b are converted to red light, green light, and blue light in sequence for each period of one-third of 1 frame and illuminated to the light value 17. A half-tone image of each color (red field, green field, and blue field) can be expressed, by controlling a duty cycle that each pixel in the light valve 17 is switched on during illumination of the respective colors, according to the input video signal. In addition, by switching these in sequence at high speeds, they can be showed as if a full color image were displayed to the human eye.

FIG. 5 is a diagram for explaining the timing at which a color-sequence display type in the first embodiment is performed. In the first embodiment, the period of each color field (sub-field) is further divided into two periods, and the first and second lamps 11a, 11b are controlled by the processor 33 so that only the first lamp 11a is switched on during the first half sub-field and only second lamp 11b is switched on during the second half sub-field. The first illuminating light and the second illuminating light, transmitted through the color filters of the first and second rotary color filter discs 14a and 14b, are output by the first lamp 11a and the second lamp 11b. The DMD, which is the light valve 17, is driven according to the gradation in the input video signal. That is, an ON-period is set by the processor 33, and the first illuminating light and the second illuminating light are projected on the screen 19 through the projection lens 18. Actually, a value corresponding to the gradation of the input video signal is the sum of the illuminating light in the first half sub-field and the illuminating light in the second half sub-field. In the first embodiment, whether the illuminating light from the first lamp 11a or the illuminating light from the second lamp 11b is reflected toward the projection lens 18 is determined by whether the micro mirror 20 of the DMD is tilted clockwise or counterclockwise. That is, since the ON-polarity and the OFF-polarity are to be inverted, the polarity in the second half sub-field with respect to the first half sub-field is inverted in controlling the duty cycle of the micro mirror 20. A slight dark period during which both the first and second lamps 11a and 11b are switched off is inserted into the sub-field so that an unnecessary image is not displayed during the time that the polarity is inverted.

Note that it is known that, for example, in the metal halide lamps employed in the first all and second lamps 11a and 11b, the period during which the electric arc continues is known to be a few ms after the current is cut off. Hence, by rotating the first and second rotary color filter discs 14a and 14b two or more revolutions for each frame, or by dividing the color filter shown in FIG. 2 into multiples of 3 (6 or more parts), not 3 parts, it is also preferable to make the period of the sub-field sufficiently short.

In addition, even if the current that is supplied to the first and second lamps 11a and 11b is shut off in a moment, the electric arc will continue. For that reason, there is a possibility that slight luminescence will remain, black will float, and contrast will become weak. To solve this problem, it is considered that black regions are provided in the rotary color filter discs 14a, 14b to shut off the light from the first lamp 11a and the light from the second lamp 11b during the time that the first and second lamps 11a and 11b are switched off.

While in the aforementioned description the DMD has been used as the light valve 17, it can be constructed with an element, which controls the tilt of the micro mirror 20, such as a piezo device. While it has been described that the first rotary color filter disc 14a and the second rotary color filter disc 14b have the three primary colors, the luminance in the case of displaying white can also be enhanced by adding white to the three primary colors to get four colors. Thus, techniques that can be utilized in the DMD single-panel projector can likewise be utilized in the first embodiment. Although it has been described that the first rotary color filter disc 14a and the second rotary color filter disc 14b have the same color disposition, the color dispositions may be shifted from each other. Furthermore, different regions on a single color filter disc can be used.

According to the first embodiment, as described, approximately twice, as much brightness can be achieved by alternately pulse-driving the first lamp 11a and the second lamp 11b to illuminate the light valve 17. Because the first lamp 11a and the second lamp 11b are driven in pulse form, they can be generally made lighter compared with the case where they are switched on at all times. In addition, even if lamps have the same luminance, the light quantity of a single lamp expressed by integration will become equal to the case where a single lamp is switched on at all times, even if it is driven in pulse form, because the luminance of a lamp is determined by electric power. In the aforementioned conventional method, even if two lamps are used, the light quantity will not be increased too much because of loss in the coupling optics; however, the first embodiment is brighter than the conventional method, because there is no loss in the coupling optics. For instance, if the first embodiment is applied to a projector of 1000 lumen employing a single metal halide lamp of 270 W, a projector with a double luminance of approximately 2000 lumen can be realized. Also, the conventional DMD single-panel type projector is forced to use a 270-W metal halide lamp with a lifetime of about 1000 hr, etc., because it cannot obtain sufficient luminance with a 120-W UHP lamp having a long lifetime of about 5000 hr. However, according to the first embodiment, the lifetime can be extended to about 5000 hr by using two 120-W UHP lamps. Furthermore, it becomes possible to realize a projector with luminance equal to or greater than a 270-W metal halide lamp, considering a 120-W UHP is small in arc gap and high in efficiency.

In the prior art, since the illuminating light from the first lamp and the illuminating light from the second lamp are superposed by shifting the light center or tilt between the first and second lamps, illuminance unevenness occurs when only one of the two lamps is switched on. However, in the first embodiment, the first lamp 11a and the second lamp 11b are identical in center and tilt with the illuminating light in the case designed so that a single lamp is originally used. Therefore, even in the event of switching on only one of the two lamps (first lamp 11a or second lamp 11b), it becomes possible to prevent occurrence of such illuminance unevenness.

The first embodiment is constructed such that the quantity of light is approximately doubled by alternately switching on the first lamp and the second lamp in pulse form. In the second embodiment, the cycle of an exchange of lamps is approximately doubled by adding the function of switching to the second lamp when the first lamp reaches its lifetime or fails.

Note that the same reference numerals will be applied to the same parts as the first embodiment for avoiding their detailed description.

FIG. 6 is a block diagram for explaining the control operation in a second embodiment of the present invention. The second embodiment differs from the first embodiment described in FIG. 4, in that although it is not provided with the first pulse drive circuit 39a and the second pulse drive circuit 39b, it is provided with a first lamp-failure detection circuit 45a and a second lamp-failure detection circuit 45b. The first lamp-failure detection circuit 45a and the second lamp-failure detection circuit 45b are constructed, for example, so that they can check a current value to be supplied to the first lamp 11a and the second lamp 11b and then judge lamp failure when no current flows.

In the second embodiment, instead of alternately switching on the first lamp 11a and the second lamp 11b like the first embodiment, only the first lamp 11a, for example, is first switched on to project light on a screen 19. When the first lamp-failure detection circuit 45a detects lamp failure, the second lamp 11b is immediately switched on. That is, after receiving failure detection output by the first lamp-failure detection circuit 45a, a processor 33 outputs a lamp selecting signal to a switching circuit 38, which is selecting the first lamp 11a. The switching circuit 38 then selects the second lamp 11b. As a result, the output of a lamp power source 37 is supplied to the second lamp 11b, which is in turn switched on. In addition, the processor 33 switches a switching circuit 35 to invert the polarity of the output of an input video signal at an inverter 36, whereby the function of the light valve 17 is switched from the first state shown in FIG. 3A to the second state shown in FIG. 3B. Thus, even in the case where the first lamp 11a fails, projection by the second lamp 11b becomes possible and therefore it becomes possible to double the apparent lifetime of the projector lamp.

Note that in the second embodiment, as with the first embodiment, a reduction in the efficiency of the illuminating light due to coupling optics will not occur, because it does not require an optical system for coupling the first lamp 11a and the second lamp 11b. Also, in the prior art, the illuminating light from the first lamp and the illuminating light from the second lamp are superposed by shifting the center or tilt of the illuminating light that is emitted from each of the first and second lamps. For that reason, when only one of the two lamps is switched on, the occurrence of great illuminance unevenness cannot be avoided. In the second embodiment, the illuminating light from each of the first and second lamps 11a, 11b is identical in center and tilt with the illuminating light in the case designed so that a single lamp is originally used. Therefore, even if only one of the two lamps is switched on, there is no occurrence of illuminance unevenness due to this.

In addition, in the second embodiment, DC drive generally used can be employed because there is no need to drive the first lamp 11a and the second lamp 11b in pulse form. Furthermore, the second embodiment may be constructed so that it has two lamp power sources 37.

According to the second embodiment, as described above, the cycle of an exchange of lamps can be approximately doubled by adding the function of switching to the second lamp 11b if the first lamp 11a reaches its lifetime or fails. In addition, since the light from the first lamp 11a and the light from the second lamp 11b are projected by employing the two states of the light valve 17, there is no loss due to the coupling optics for superposing the light from the first lamp 11a and the light from the second lamp 11b and therefore it becomes possible to achieve and maintain much the same luminance as a projector, etc., designed so that it originally uses a single lamp.

Note that in the second embodiment, the second lamp 11b is kept in standby, also in the first embodiment, and is used if the first lamp 11a fails. However, in the case where the first lamp 11a, for example, cannot be switched on because of failure, etc., in the course of alternately switching on the first lamp 11a and the second lamp 11b, as described in the first embodiment, it is also possible to control the projector by switching on the second lamp 11b alone.

This case is advantageous in that projection is continued, although the luminance of an image projected will be reduced.

As an application of the first embodiment in which the first and second lamps are alternately switched on in pulse form, the third embodiment is applied to displaying a three-dimensional image instead of approximately doubling a quantity of light.

Note that the same reference numerals will be applied to the same parts as the first and second embodiments to avoid their detailed description.

FIG. 7 is a diagram showing the optical system of a projector that is an illuminating-light controller in the third embodiment. This embodiment is differentiated from FIG. 1, there is provided a first and second polarizing optics 51, 52. The first polarizing optics 51 is inserted in the illuminating optics for the first lamp 11a to transmit only polarized light that vibrates in a vertical direction, while the second polarizing optics 52 is inserted in the illuminating optics for the second lamp 11b to transmit only polarized light that vibrates in a horizontal direction. The first and second polarizing systems 51, 52 can employ simple polarizing panels. However, in this case, half of incident light is wasted and therefore an image finally obtained becomes darker. For that reason, if polarization conversion optics, which consist of a polarization beam splitter, a half-wave panel, and a polarizing panel, are used as the polarizing optics 51, 52, the polarized component which will be discarded wastefully in the case of only a polarizing panel can be converted to an effective polarized component and therefore a lighter image can be obtained.

FIG. 8 is a block diagram for explaining the control operation in the third embodiment. This embodiment primarily differs from FIG. 4 there is provided a R-frame memory 53 and a L-frame memory 54. That is, the output from a processor 33 is switched by a switching circuit 35 with an L/R selecting signal and is input to the R-frame memory 53 and the L-frame memory 54. In the R-frame memory 53, image data for the right eye, separated for each R, G, and B, is developed for each frame. In the L-frame memory 54, image data for the left eye is developed for each frame. The output (image data for the right eye) from the R-frame memory 53, as it is, is input to the light valve 17 and optically modulated. The output (image data for the left eye) from the L-frame memory 54 is inverted and input to the light valve 17 and is optically modulated.

FIG. 9 is a diagram for explaining the timing at which a three-dimensional image is displayed according to the third embodiment. During the first half of each color field (sub-field), the first lamp 11a is switched on and an image for the right eye is displayed. During the second half of each color field (sub-field), the second lamp 11b is switched on and an image for the left eye is displayed. The first illuminating light irradiated by the first lamp 11a, and the second illuminating light irradiated by the second lamp 11b, are alternately output during 1 sub-frame. If a viewer of a projected image has spectacles with its right polarizing panel, which transmits only polarized light vibrating vertically, on the right eye and its left polarizing panel, which transmits only polarized light vibrating horizontally, on the left eye, images for the right and left eyes are selectively transmitted through and are therefore recognized as the three-dimensional image. Furthermore, by adding a mechanism of removing the polarizing optics 51, 52, inserted in the illuminating optics for the first and second lamps 11a, 11b, from the respective optical paths, normal display and three-dimensional display can be switched.

Thus, according to the third embodiment, even in the event of three-dimensional display, a brighter image is obtained because two lamps are used, unlike the conventional technique for polarizing light emitted from a single lamp for the right and left eyes by the use of a rotary polarizing panel. In addition, as the polarizing optics is not integral with the color filter but is fixed to the outside and installed, the existing polarization conversion optics can be utilized, and furthermore, a lighter image can be obtained. Moreover, by adding the function of removing the polarizing optics from the optical paths, three-dimensional display and normal display can be readily switched.

According to the present invention, as has been described hereinbefore, there is no loss due to the coupling optics for superposing lights, even when using a plurality of lamps, and it becomes possible to ensure approximately twice as much brightness, compared with the case of employing a single lamp.

In addition, by switching to the second lamp even if the first lamp fails because of its lifetime, etc., much the same brightness as a single lamp can be ensured by eliminating loss due to the coupling optics, and the cycle of an exchange of lamps can be approximately doubled.

Furthermore, three-dimensional images can be displayed by polarizing light from the first lamp and light from the second lamp in different manners.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

We claim:

1. An illuminating-light controller comprising:
   a micro mirror type spatial light modulator for projecting light, emitted from a light source, on a corresponding area by tilting a reflecting surface;
   a first light source for emitting a first light which is projected on said corresponding area by said reflecting surface of said spatial light modulator being tilted at a first angle;
   a second light source for emitting a second light which is projected on said corresponding area by said reflecting surface of said spatial light modulator being tilted at a second angle; and
   a control section for controlling said first light emitted from said first light source and said second light emitted from said second light source.

2. The illuminating-light controller according to claim 1, wherein said control section controls said first and second light sources so that they are alternately driven to emit light.

3. The illuminating-light controller according to claim 2, further comprising:
   a first polarizing optics, provided in an optical path along which the light emitted from said first light source reaches said reflecting surface of said spatial light modulator, for polarizing said light in a specific direction; and
   a second polarizing optics, provided in an optical path along which the light emitted from said second light source reaches said reflecting surface of said spatial light modulator, for polarizing said light in a direction different from said specific direction.

4. The illuminating-light controller according to claim 1, further comprising a failure detecting section for detecting failure of said first light source, wherein said control section drives said second light source to emit light if said failure detecting section detects the failure of said first light source.

5. The illuminating-light controller according to claim 1, wherein said spatial light modulator is a digital micro mirror device.

6. A projector comprising:
   a first light source for emitting light in pulse form;
   a second light source for emitting light in pulse form, said first light source and said second light source being switched alternately;
   a spatial light modulator equipped with a micro mirror tiltable at a first angle and a second angle, light modulation being performed by tilting said micro mirror;
   a projection lens on which the light reflected by said micro mirror of said spatial light modulator is incident; and
   a control section for controlling said first light source so that the light emitted from said first light source is modulated and directed to said projection lens with said micro mirror tilted at said first angle, and for controlling said second light source so that the light emitted from said second light source is modulated and directed to said projection lens with said micro mirror tilted at said second angle.

7. The projector according to claim 6, wherein said first light source and said second light source are alternately driven to emit light during a subfield provided for each color in a frame forming a specific image.

8. A projector comprising:
   a first light source;
   a second light source provided separately from said first light source;
   a detection section for detecting an abnormal state of said first light source;
   a spatial light modulator equipped with a micro mirror tiltable at a first angle and a second angle, light modulation being performed by tilting said micro mirror; and
   a projection lens on which the light reflected by said micro mirror tilted at said first angle or said second angle is incident;
   wherein said spatial light modulator directs light, emitted from said first light source, to said projection lens with said micro mirror tilted at said first angle, and, in the case that an abnormal state of said first light source is detected by said detection section, also directs light, emitted from said second light source, to said projection lens with said micro mirror tilted at said second angle.

9. An illuminating-light controller comprising:
   a light modulator for projecting light on a corresponding area by tilting a reflecting surface;
   a first light source for emitting a first light which is projected on said corresponding area by said reflecting surface of said spatial light modulator being tilted at a first angle;
   a second light source for emitting a second light which is projected on said corresponding area by said reflecting surface of said spatial light modulator being tilted at a second angle; and
   a control section for controlling said first light emitted from said first light source and said second light emitted from said second light source.

10. The illuminating-light controller according to claim 9, wherein said light modulator is of the spatial light modulator type.

11. The illuminating-light controller according to claim 9, wherein said light modulator is equipped with a tiltable micro mirror device.

12. An illuminating-light controller comprising:
   a light modulator for projecting light on a corresponding area by tilting a reflecting surface;
   a plurality of light sources for emitting light which are projected on said corresponding area by said reflecting surface of said light modulator;
   said reflecting surface is tiltable to a plurality of angles, each angle corresponding to the projection of light from one of said plurality of light sources; and
   a control section for controlling said plurality of light sources.

13. A method for a control means for directing a first light from a first light source and a second light from a second light source to a projection lens by tilting a micro mirror of a spatial light modulator to reflect said first and second lights at said micro mirror, said method comprising the steps of:

controlling the directing of said first light to said projection lens by tilting said micro mirror at a first angle to reflect said first light at said micro mirror; and controlling the directing of said second light to said projection lens by tilting said micro mirror at a second angle to reflect said second light at said micro mirror.

14. The method according to claim 13, further comprises the steps of alternately switching on said first light source and said second light source so that each light source emits light in pulse form.

15. The method according to claim 13, further comprises the steps of only switching on said first light source and keeping said second light source on standby; and switching on said second light source if an abnormal state of said first light source is detected.

16. A method for directing light with three primary colors to a projection lens by employing a spatial light modulator which has a first state in which a micro mirror is tilted at a first angle and a second state in which said micro mirror is tilted at a second angle, said method comprising the steps of:

constructing three color fields for each frame forming an image by said light with three primary colors; and directing light, modulated by employing said first state of said spatial light modulator, and light, modulated by employing said second state of said spatial light modulator, to said projection lens for each of said three-color fields.

17. The method according to claim 16, further comprises the steps of having:

light modulation employing said first state during the time said micro mirror is tilted at said first angle; and having light modulation employing said second state during the time said micro mirror is tilted at said second angle.

18. The method according to claim 16, further comprises the steps of differentiating the incidence angles of said light with three primary colors on said spatial light modulator between the case of the light modulation employing said first state and the light modulation employing said second state.

19. The method according to claim 16, further comprises the steps of employing the light modulation of said second state in an inverted relationship from the ON/OFF light modulation of said first state.

\* \* \* \* \*